US012305441B2

(12) United States Patent
Corbetta

(10) Patent No.: US 12,305,441 B2
(45) Date of Patent: May 20, 2025

(54) CUSHIONED HINGE FOR DOORS OF FURNITURE ITEMS AND THE LIKE

(71) Applicant: DANCO S.P.A., Veduggio con Colzano (IT)

(72) Inventor: Roberto Corbetta, Veduggio con Colzano (IT)

( * ) Notice: Subject to any disclaimer, the term of this patent is extended or adjusted under 35 U.S.C. 154(b) by 88 days.

(21) Appl. No.: 18/365,339

(22) Filed: Aug. 4, 2023

(65) Prior Publication Data

US 2024/0102329 A1 Mar. 28, 2024

(30) Foreign Application Priority Data

Sep. 28, 2022 (IT) ........................ 102022000019920

(51) Int. Cl.

| | |
|---|---|
| ***E05F 1/08*** | (2006.01) |
| ***E05F 3/20*** | (2006.01) |
| ***E05F 5/08*** | (2006.01) |

(52) U.S. Cl.

CPC .................. *E05F 5/08* (2013.01); *E05F 3/20* (2013.01); *E05Y 2900/20* (2013.01)

(58) Field of Classification Search

CPC ........... E05Y 2900/20; E05Y 2900/202; E05Y 2900/204; E05Y 2900/208; E05Y 2201/25; E05Y 2201/26; E05Y 2201/626; E05Y 2201/20; E05Y 2201/21; E05Y 2201/261; E05Y 2201/264; E05Y 2600/53; E05F 5/006; E05F 5/02; E05F 5/027; E05F 5/08; E05F 5/10; E05F 3/20; E05F 3/00; E05D 11/1021; E05D 11/1042; E05D 11/105; E05D 11/1064; E05D 7/04; E05D 7/0407; E05D 7/125; E05D 3/16; E05D 3/142

See application file for complete search history.

(56) References Cited

U.S. PATENT DOCUMENTS

| | | | | |
|---|---|---|---|---|
| 10,214,951 | B2 * | 2/2019 | Liang | E05F 5/00 |
| 11,041,336 | B2 * | 6/2021 | Weber | E05F 5/006 |
| 11,047,159 | B2 * | 6/2021 | Liang | E05D 11/1021 |
| 11,377,889 | B2 * | 7/2022 | Zetti | E05D 3/16 |

(Continued)

FOREIGN PATENT DOCUMENTS

| | | | |
|---|---|---|---|
| CN | 207892405 U | * | 9/2018 |
| CN | 211691975 U | | 10/2020 |

OTHER PUBLICATIONS

Search Report for Italian Priority Application No. 102022000019920, dated May 12, 2023.

*Primary Examiner* — Chuck Y Mah

(74) *Attorney, Agent, or Firm* — Egbert, McDaniel & Swartz, PLLC

(57) ABSTRACT

Disclosed is a cushioned hinge for doors of furniture items or the like. The hinge has a fixed part that can be attached to a side wall or shoulder of the item of furniture, a movable part that can be attached to a door of the item of furniture, and an articulated system that connects the fixed and movable parts of the hinge. The articulated system has a plurality of connecting rods and of axes of articulation. An elastic part or parts act in the direction of closure of the hinge. A linearly actuated deceleration mechanism slows down the last section of the stroke of closure of the hinge. The cushioned hinge leaves the edge of the door completely intact, so that the box remains hidden from view when the door is closed.

10 Claims, 9 Drawing Sheets

(56) References Cited

U.S. PATENT DOCUMENTS

| | | | | |
|---|---|---|---|---|
| 2011/0072617 | A1 * | 3/2011 | Lin | E05F 5/006 16/298 |
| 2013/0239363 | A1 * | 9/2013 | Apur | E05F 5/006 16/50 |
| 2017/0218675 | A1 * | 8/2017 | Cooper | E05D 3/142 |
| 2018/0252016 | A1 | 9/2018 | Salice | |
| 2024/0068291 | A1 * | 2/2024 | Capur | E05F 5/006 |

* cited by examiner

CUSHIONED HINGE FOR DOORS OF FURNITURE ITEMS AND THE LIKE

FIELD OF THE INVENTION

The present invention relates to a cushioned hinge for doors of furniture items, such as cupboards and the like, in particular for high-capacity cupboards.

BACKGROUND OF THE INVENTION

In As is known, hinges for furniture items are used to allow the opening and closing of doors and comprise a fixed part or arm, to be attached internally to a side wall or shoulder of the furniture item, and a movable part, in the form of a bowl or box, to be attached to the door, said fixed and movable parts being oscillatingly connected one to the other by a system of articulated levers, generally comprising at least one pair of connecting rods or rockers.

These hinges are normally provided with elastic means suitable for stressing the door in closure and with damping devices, which intervene in the final phase of closure of the door, slowing down the stroke thereof and thus preventing it from slamming with force against the body of the furniture item.

One of these hinges is, for example, described in document CN 211691975, which has the following main limitations:

- the connecting rods (rockers) of the hinge have a conformation which requires a movement such that a milling has to be made on the door (as well as on the shoulder of the furniture item) starting from its edge, such as to leave the side part of the door open, thus leaving a part of the box of the hinge in view with door closed;
- the arm of the hinge is made up of a single part, which does not allow the forming of several neckings to resolve the various covers of the door on the side;
- the box of the hinge is too large, thus making it impossible to make doors with the aluminium profile but limiting the use of the hinge to doors in wood.
- the elastic means and the damping means (damper) are actuated jointly, with no possibility of performing separate adjustments.

US 2018/0252061 A1 describes a hinge for furniture items comprising a flattened fixed part designed to be inserted in the thickness of the upper or lower wall of a furniture item, and a movable part that can be attached to the door, the fixed part and the movable part being connected one to the other by means of an articulation system comprising two rockers and respective axes of articulation. The two rockers are placed on a same plane, which is the median plane of the fixed part of the hinge, perpendicular to said axes of articulation. As shaped, the fixed part of the hinge can only be attached to a horizontal plane of the furniture item, i.e. the upper or lower plane. There is no possibility of attaching it to a vertical wall of the furniture item, i.e. to a side wall or shoulder, wherein the fixed part of the hinge has to extend along a plane parallel to the axes of articulation, in order to allow a swing opening of the door.

The object of the invention is to eliminate the disadvantages of the hinge known from document CN 211691975, described above.

More particularly, one object of the invention is to provide a cushioned hinge for doors of high-capacity furniture items which leaves the edge of the door completely intact, so that the box remains hidden from view when the door is closed.

Another object of the invention is to provide such a hinge which allows for more or less coverage, with movement of the door inwards.

Yet a further object of the invention is to provide such a hinge, the box whereof is shaped so as to facilitate the adjustments thereof.

It is a further object of the invention to provide such a hinge, wherein the actuation of the elastic means and of the damper take place with separate means.

Yet a further object of the invention is to provide such a cushioned hinge which is simple and inexpensive to manufacture, and highly reliable.

BRIEF SUMMARY OF THE INVENTION

The These objects are achieved by the cushioned hinge for doors of high-capacity furniture items according to the invention that has the features of the appended independent claim 1.

Advantageous embodiments of the invention are disclosed in the dependent claims.

Substantially, the cushioned hinge for doors of furniture items or the like according to the invention, comprises:

- a fixed part, that can be attached to a side wall or shoulder of the item of furniture;
- a movable part, that can be attached to a door of the item of furniture;
- an articulated system that connects said fixed and movable parts of the hinge, comprising a plurality of connecting rods and of axes of articulation;
- elastic means acting in the direction of closure of the hinge;
- linearly actuated deceleration means designed to slow down the last section of the stroke of closure of the hinge;

wherein said fixed part comprises a base having a central part, open frontally, intended to be housed in a seat formed in the thickness of said side wall of the furniture item, and a plate-shaped frame that extends along a plane parallel to said axes of articulation attached to this side wall, and an arm mounted in said central part of the base with the possibility of adjustments, said arm having a first rear section, distal from the movable part, which is placed substantially flush with said plate-shaped frame, and a second proximal section, inclined upwards, such as to protrude with respect to the plate-shaped frame, and wherein said movable part comprises a cage mounted, also with the possibility of adjustment, in a box intended to be housed in a corresponding seat formed on the door, said arm and said cage being connected one to the other by said articulated system.

BRIEF DESCRIPTION OF THE SEVERAL VIEWS OF THE DRAWINGS

Further features of the invention will be made clearer by the following detailed description, referred to a purely non-limiting example thereof, illustrated in the accompanying drawings, wherein.

DETAILED DESCRIPTION OF THE INVENTION

Figure 1:
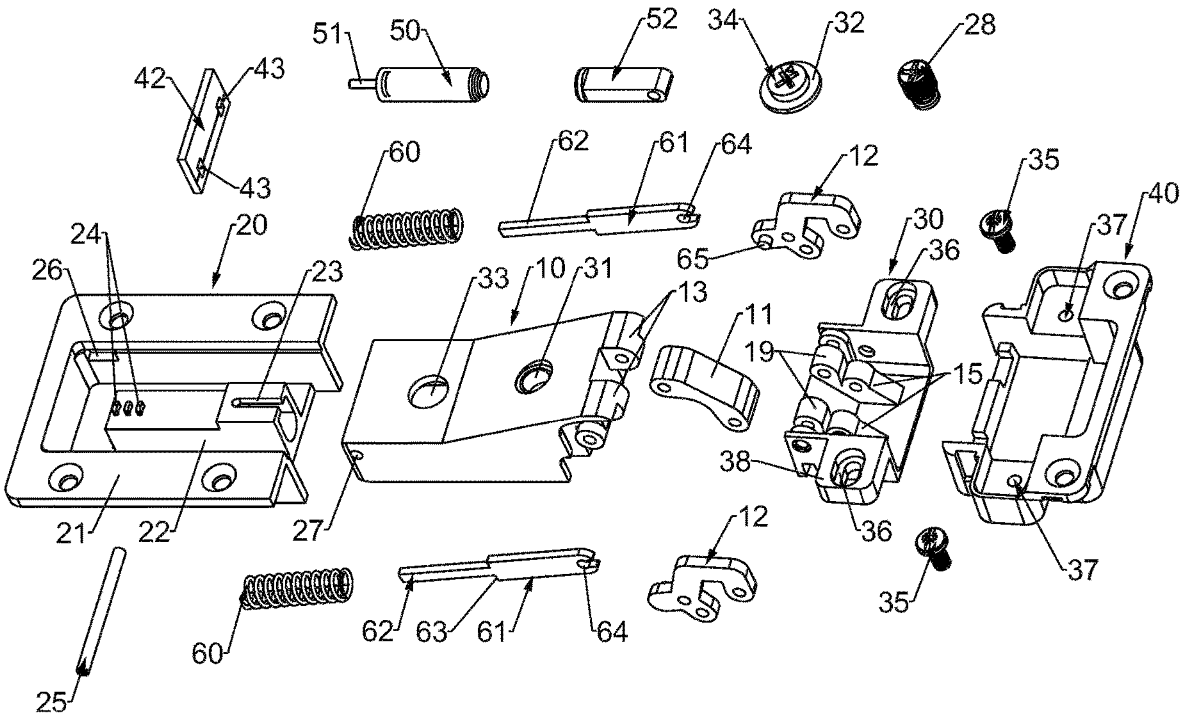
FIG. 1 is an axonometric blown-up view from above of a cushioned hinge according to the invention.

Referring to these drawings, the hinge according to the invention, denoted as a whole by reference numeral 1, comprises a fixed part 2, which can be attached to a side wall or shoulder 4 of the furniture item, and a movable part 3 which can be attached to a door 5 of the furniture item, connected one to the other by means of an articulated system.

Figure 9:
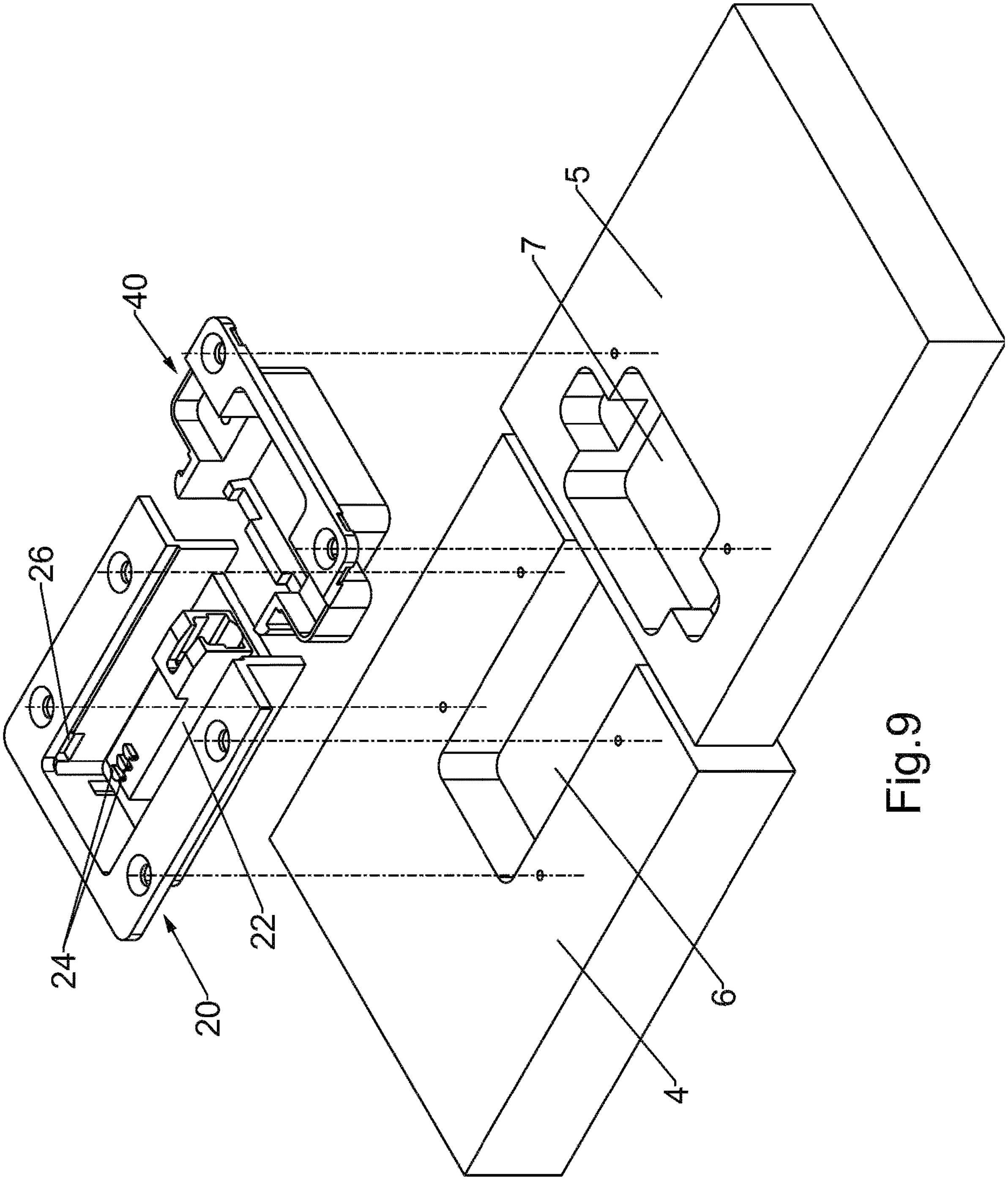
FIG. 9 is a blown-up schematic view showing the assembly of the elements of containment of the hinge on an item of furniture.

More particularly, the fixed part 2 comprises an arm 10, mounted, with the possibility of slight adjustments, as will be discussed here below, in a base 20 housed in a seat 6 formed in the thickness of the side wall 4, while the movable part 3 comprises a cage 30 mounted, also with slight adjustment possibilities, in a box 40, housed in a corresponding seat 7 formed on the door 5 (see in particular FIG. 9).

The arm 10 and the cage 30 are connected one to the other by means of the above-mentioned articulated system, substantially comprising a central connecting rod 11 and a pair of lateral connecting rods 12.

Figure 2:
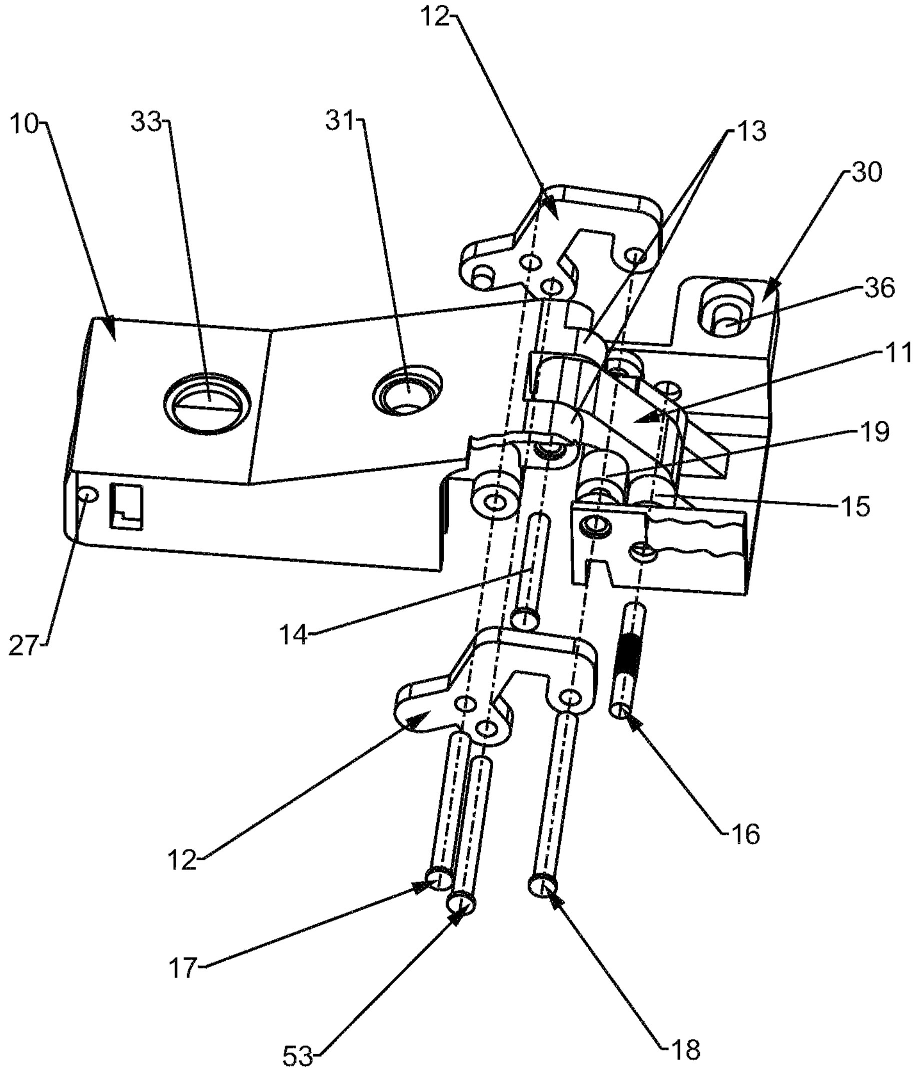
FIG. 2 is a blown-up view, partially cutaway, showing some of the components of FIG. 1 in the assembly phase.
Figure 3:
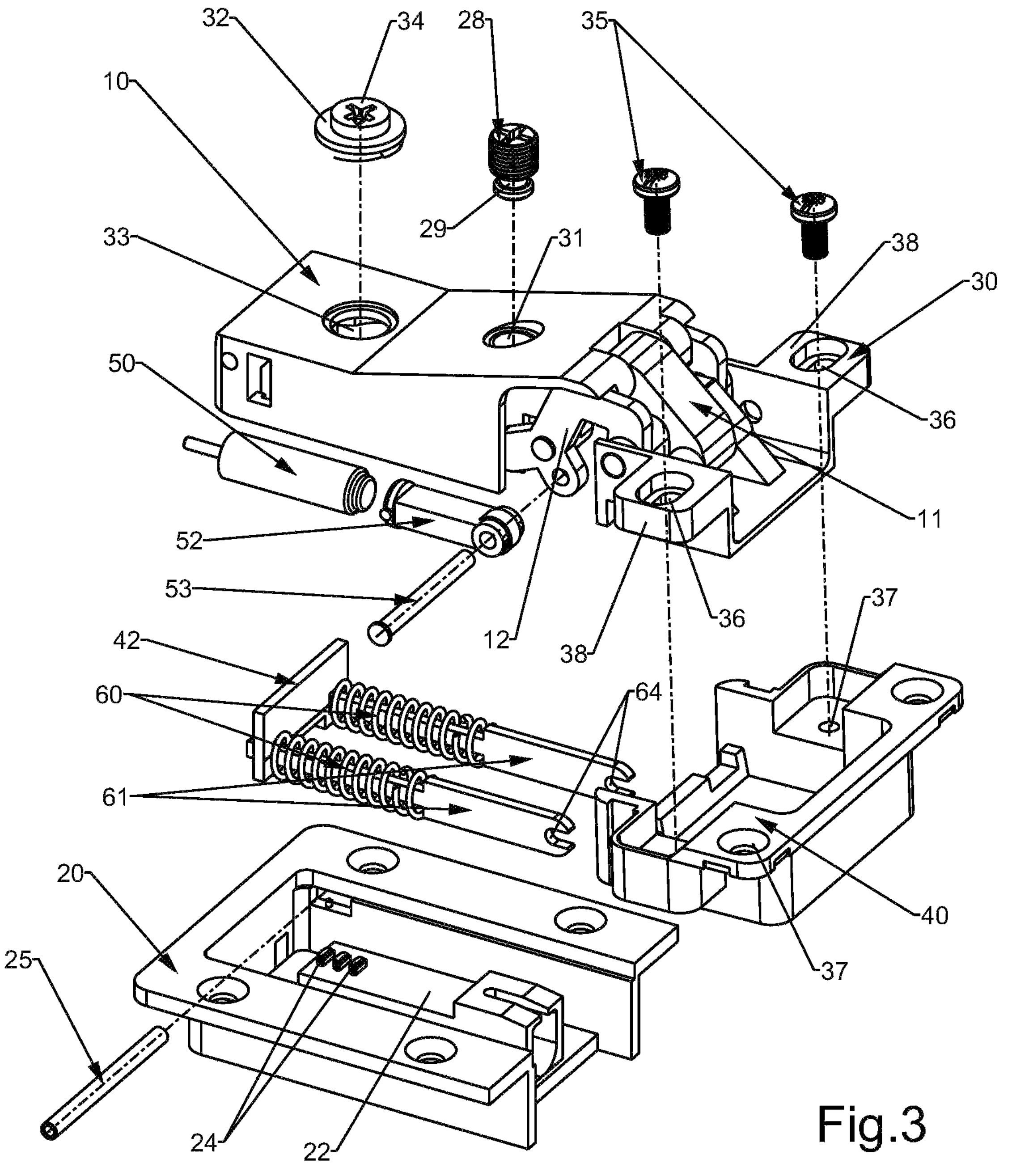
FIG. 3 is a blown-up view of the hinge of FIG. 1 in an intermediate stage of assembly.
Figure 4:
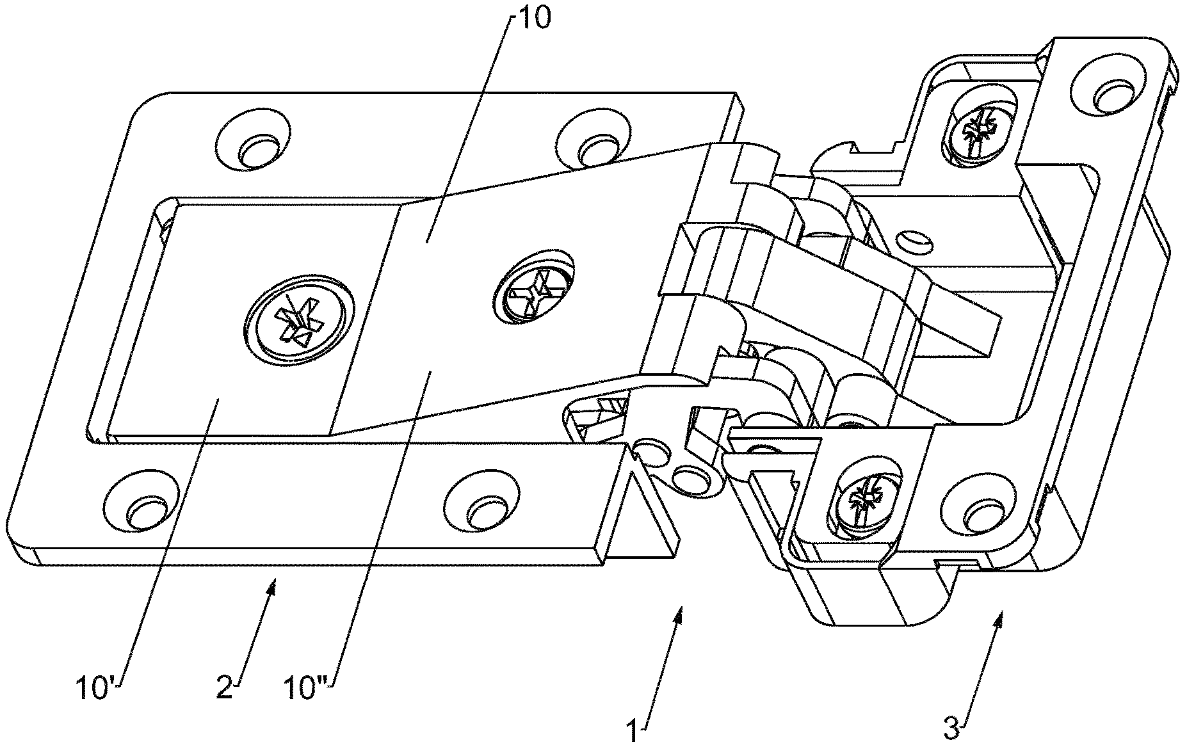
FIG. 4 is an enlarged view of the hinge of FIG. 1 in an assembled condition.
Figure 5:
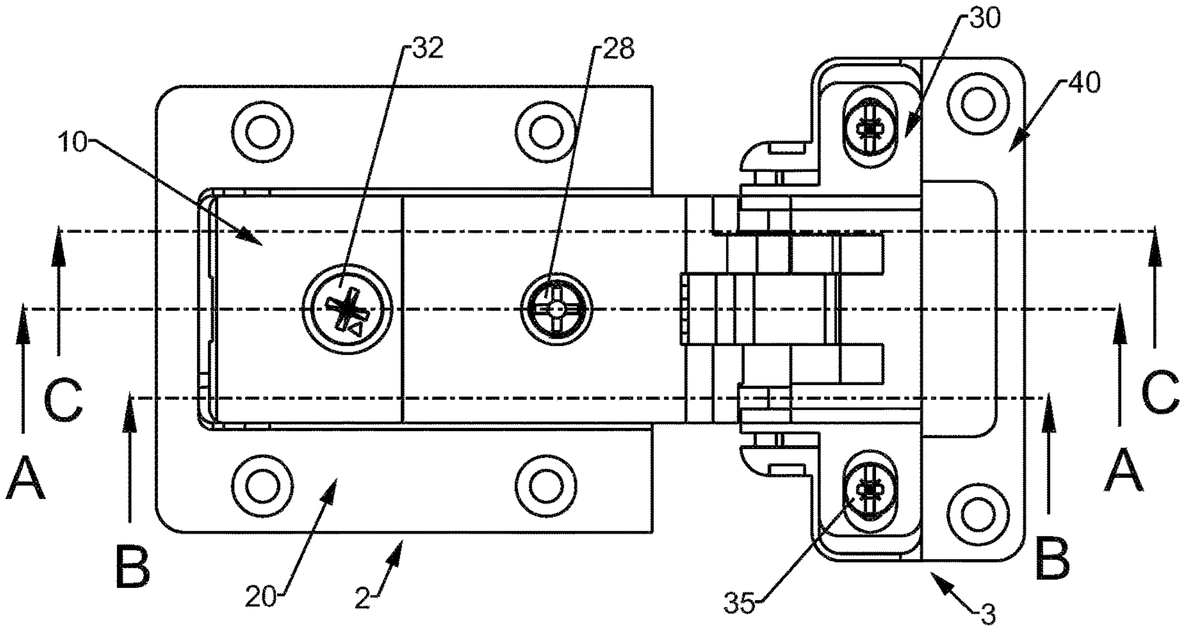
FIG. 5 is a plan view of the assembled hinge.

The central connecting rod 11 is a slightly arched lever, pivoted, on one side, between two small lugs 13 projecting frontally from the arm 10 by means of a nail 14 constituting a first axis of articulation (see in particular FIG. 2) and, on the other side, between a pair of small lugs 15 provided internally to the cage 30 by means of a knurled rod 16 constituting a second axis of articulation.

The lateral connecting rods 12 have a particular conformation, substantially in the shape of an upside-down Y, with the central stem 54 prolonged with an arched shape that extends towards the cage 30.

The lateral connecting rods 12 are pivoted, on one side, to the arm 10 in a third axis of articulation formed by a nail 17 which traverses approximately centrally the connecting rods 12 and is placed in a more internal position with respect to the first axis of articulation 14. On the other side, the lateral connecting rods 12 are pivoted, at the ends of their arched extensions, in a fourth axis of articulation constituted by a nail 18, externally to a pair of small lugs 19 provided in the cage 30, in an aligned, raised and more advanced position with respect to the pair of small lugs 15.

The base 20 of the fixed part 2 of the hinge has a central part, open frontally, which is housed in the seat 6 of the side wall of the furniture item, and a plate-shaped frame 21 that extends along a plane parallel to said axes of articulation 14, 16, 17, 18 attached to this wall by means of screws not shown.

In this central part a hollow longitudinal block 22 is provided, substantially parallelepipedal in shape, open frontally, where an upper longitudinal slot 23 is provided, while transverse reliefs 24 are provided to the rear of the upper wall of the block 22.

The arm 10 is housed in the central part of the base 20 and has a first rear section 10', distal from the movable part 3, which is placed substantially flush with said plate-shaped frame 21, and a second proximal section 10", inclined upwards, such that it protrudes with respect to the plate-shaped frame 21, as can be seen more clearly in the sectional views of FIGS. 6*a* to 8*b*. The purpose of the protruding inclined section 10" of the arm 10, to which the connecting rods 11, 12 are pivoted, is to be able to form the aforesaid seat 7 for housing the movable part 3 of the hinge, entirely within the profile of the door 5, without affecting the edge of the same (see FIG. 9), in such a way that there are no visible parts of the hinge with the door closed.

The arm 10 is restrained to the base 20 by means of a pin 25, which traverses longitudinal openings 26 in the side walls of the base 20 and corresponding circular holes 27 in the side walls of the arm 10, in such a way that the arm 10 can oscillate and translate longitudinally for the distance allowed by the openings 26.

The arm 10 is likewise attached to the base 20 by means of a regulation screw 28, having a shank with a peripheral groove 29, such that it is housed in the slot 23 of the block 22 (see in particular FIG. 6), in such a way that a rotation in one direction or the other of the screw 28, inserted in a threaded hole 31 of the arm 10, produces a raising or lowering of the arm 10 with respect to the base 20, which corresponds to a lateral adjustment of the door 5, by means of the movement imparted thereto by the system of articulation.

For the longitudinal translation of the arm 10 with respect to the base 20, which corresponds to a frontal adjustment of the door, a cam 32 is instead provided, having below a spiral profile that goes to engage with the transverse projections 24 provided above the block 22 (see FIG. 6), and that can be actuated by rotation of a head 34 projecting above from a hole 33 of the arm 10.

Substantially, the base 20, and generally the entire fixed part 2 of the hinge, is developed along a plane parallel to the axes of articulation 14, 16, 17, 18.

The cage 30 is attached to the box 40 by means of screws 35, inserted in transverse slots 36 provided in lateral fins 38 of the cage 30, that are screwed into circular holes 37 provided in the box 40. In this way the position of the cage 30 can be regulated transversally with respect to the box 40, which corresponds to a vertical regulation of the door 5.

The hinge also comprises a system of control of the movement of closure of the door, made up of elastic means suitable for bringing the door into the closing position and for keeping it in this position, and deceleration means suitable for braking the door in the final phase of closure to prevent it from slamming with force against the body of the furniture item.

These means, which will now be described, are housed in the base 20 of the fixed part of the hinge, below the arm 10, and are actuated by the system of articulation of the door.

More particularly, the deceleration means comprise a shock absorber or damper 50, made up of a cylinder, for example an oil cylinder, housed in the hollow block 22, the stem 51 of which traverses the rear wall 41 of the block and abuts against a plate 42 positioned behind the wall 41.

The damper 50 is actuated by a lever 52 pivoted on an axle 53 that connects the ends of respective shanks 55 of the Y conformation of the lateral connecting rods 12.

Figure 6A:
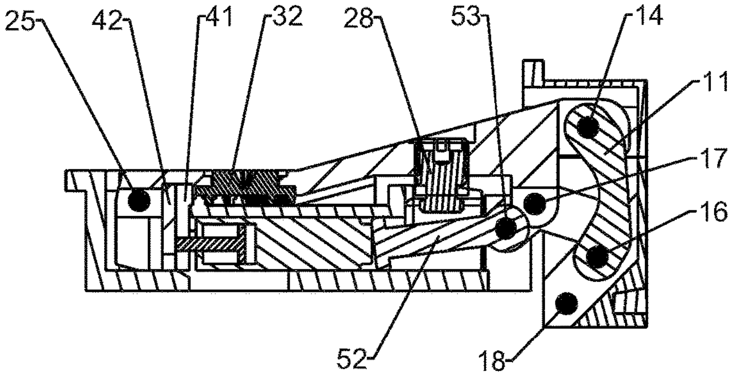
FIGS. 6*a*, 6*b* and 6*c* are median section views, taken along plane A-A of the assembled hinge of FIG. 5, shown in a position of closure, in an intermediate position of opening/closure and in a position of opening, respectively.
Figure 6B:
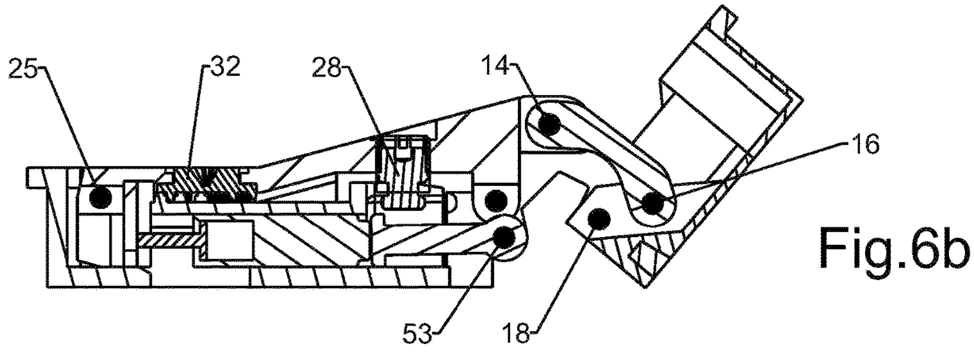
Figure 6C:
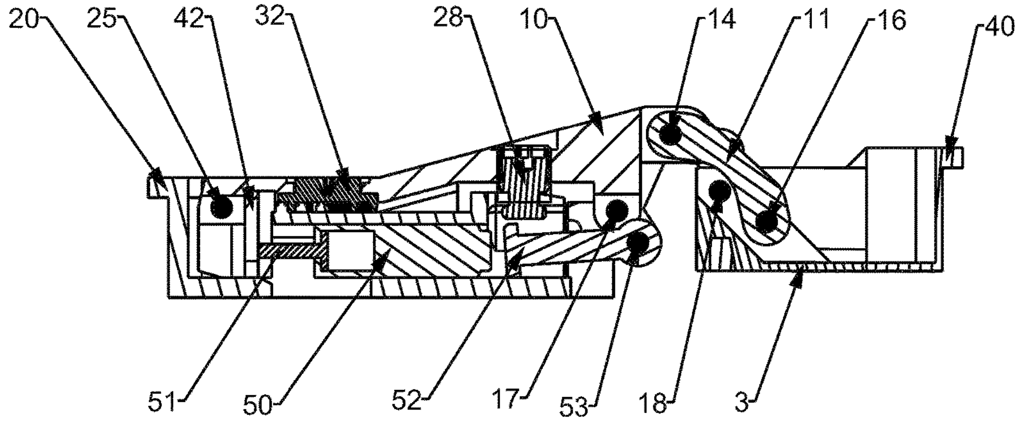
Figure 7A:
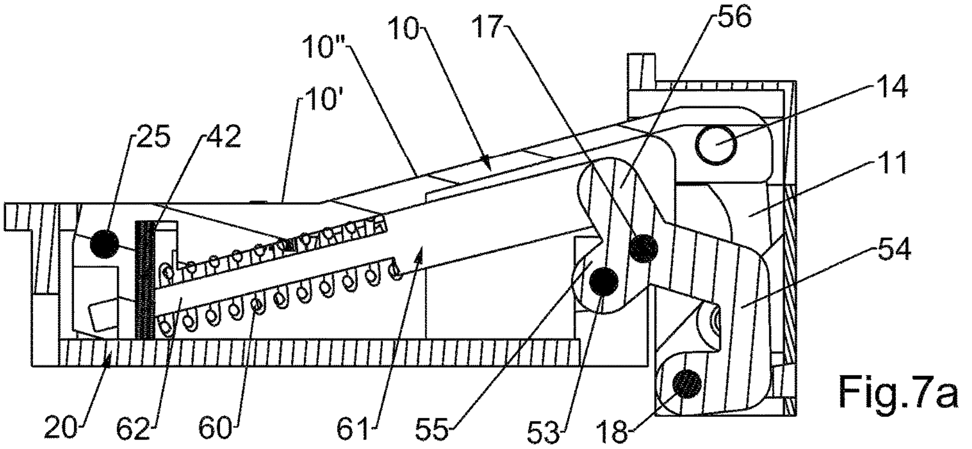
FIGS. 7*a* and 7*b* are section views taken along plane B-B, at one of the connecting rods, of the assembled hinge of FIG. 5, shown in position of closure and in position of opening, respectively.
Figure 7B:
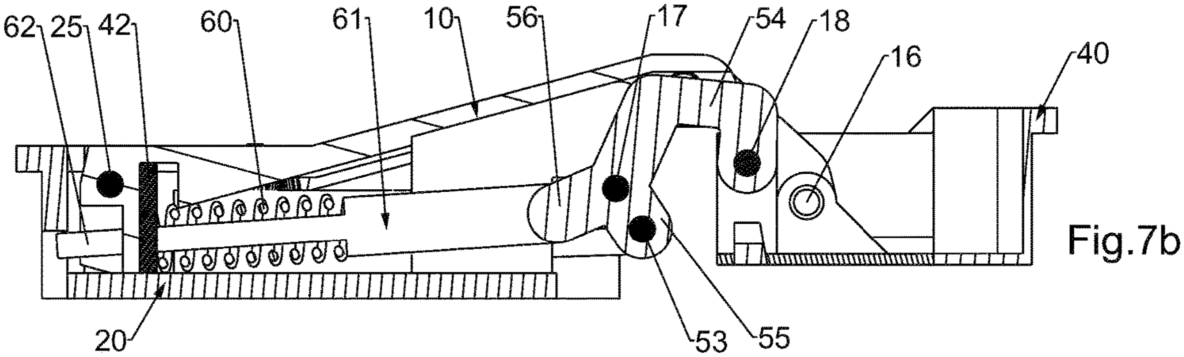

During the closure of the door, rotation of the connecting rods 12 produces compression of the damper 50, as shown, in sequence, by FIGS. 6*c*, 6*b*, 6*a*, thereby producing deceleration of the movement of the door in the final phase of closure.

The elastic means comprise a pair of springs 60 placed in the base 20, at the two sides of the block 22, which also go to abut, with one end, against the aforementioned plate 42, which acts as anchorage for the same.

The springs 60, in this case of the helical type, are placed on respective spring holders 61, having a tapered stem 62, such as to determine a stop 63, against which the other end of the corresponding spring at least partially abuts.

Figure 8A:
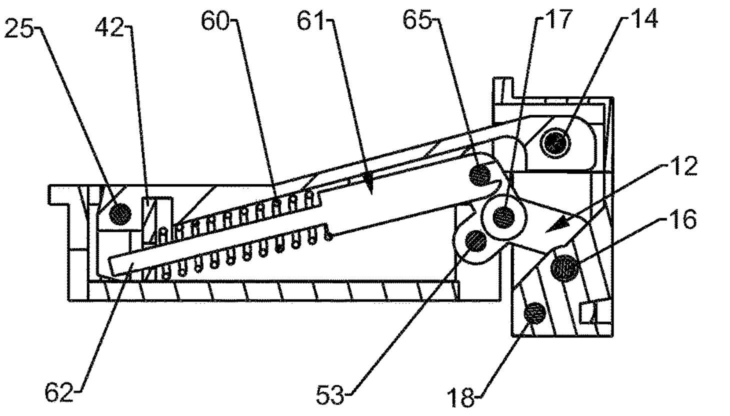
FIGS. 8*a* and 8*b* are section views taken along plane C-C, at one of the elastic devices, of the assembled hinge of FIG. 5, shown in position of closure and in position of opening, respectively.
Figure 8B:
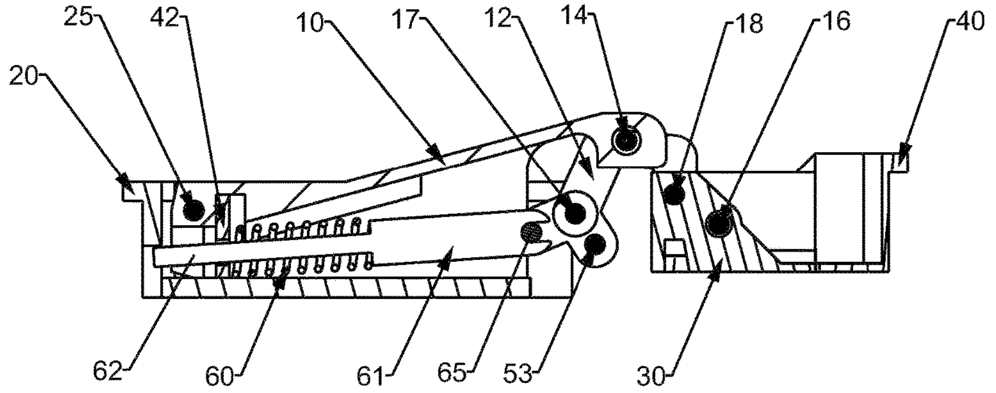

The stems 62 of the spring holders 61 are inserted in corresponding holes 43 provided in the plate 42 to allow the compression of the springs 60 in the phase of opening of the door, by means of the system of articulation, as shown by FIGS. 8*a* and 8*b*.

In fact, each spring holder 61 has, at the free end, a sort of eyelet 64 which goes to hook up with a corresponding peg 65 protruding internally from the end of the other leg 56 of the Y conformation of the corresponding lateral connecting rod 12.

The springs 60, that are compressed with the door open (FIGS. 7*b*, 8*b*), tend to unload and accompany the door in the phase of closure, exerting a force on the lateral connecting rods 12, that rotate around their respective axis of articulation 17.

From what has been disclosed, the advantages of the cushioned hinge for doors of furniture items or the like, in particular for high-capacity cupboards, according to the invention, are clear.

More particularly, the central connecting rod 11 and the lateral connecting rods 12 remain almost totally contained in the box 40 of the movable part 3 of the hinge, in the closed condition, which, together with the inclined section 10" of the arm 10, allows the relative seat 7 to be formed completely inside the door 5, without affecting its edge, such that, with the door closed, it remains entirely concealed.

The fact then of having made the fixed part 2 of the hinge in two parts, arm 10 and base 20, makes it possible to carry out the aforementioned adjustments, not possible according to document CN 211691975, in which the arm is made in a single part.

Furthermore, the elastic means and the damper are actuated by separate means, which makes separate adjustments possible.

Naturally the invention is not limited to the particular embodiment previously described and illustrated in the accompanying drawings, but numerous detailed changes may be made thereto within the reach of the person skilled in the art, without thereby departing from the scope of the same invention as defined by the appended claims.

I claim:

1. A hinge assembly for a door of a furniture article, the hinge assembly comprising:
- a fixed part adapted to be attached to a side wall or a shoulder of the furniture article;
- a movable part adapted to be attached to the door of the furniture article;
- an articulated system connected to said fixed part and to said movable part, said articulated system having a plurality of connecting rods with a plurality of axes of articulation;
- an elastic element adapted to act in a direction of closure of the hinge assembly; and
- a linear actuator adapted to slow a rate of closure of the hinge, wherein said fixed part has a base with a central portion, the base being frontally open, said fixed part adapted to be housed in a seat formed in a thickness of the side wall of the furniture article, the base having a plate-shaped frame extending along a plane parallel to at least one of the axes of articulation, the plate-shaped frame adapted to be attached to the side wall of the furniture article, said fixed part having an arm adjustably mounted to the central portion of the base, the arm having a rear section distal from said movable part, the rear section positioned substantially flush with the plate-shaped frame, the arm having an upwardly inclined proximal section protruding from the plate-shaped frame, wherein said movable part has a cage adjustably mounted in a box, the box adapted to be housed in a seat formed on the door, said articulated system connecting the arm with the cage.

2. The hinge assembly of claim 1, wherein said articulated system has a central connecting rod and a pair of lateral connecting rods.

3. The hinge assembly of claim 2, wherein the central connecting rod is an arched lever pivotally mounted to the arm at a first axis of articulation and to the cage at a second axis of articulation.

4. The hinge assembly of claim 3, wherein the pair of lateral connecting rods has an inverted Y-shaped configuration with a central shank, the central shank having an arch shape extending toward the cage, the pair of lateral connecting rods being pivotally mounted on one side to the arm at a third axis of articulation and pivotally mounted at an opposite side thereof to the cage at a fourth axis of articulation.

5. The hinge assembly of claim 4, wherein the pair of lateral connecting rods are adapted to be contained in the box in a closed position.

6. The hinge assembly of claim 5, wherein the base of the fixed part has a frontally open central part in which a hollow longitudinal block is received, the hollow longitudinal block being frontally open and having an upper longitudinal slot, the hollow longitudinal block having transverse reliefs at a rear of an upper wall of the hollow longitudinal block, the arm being housed in the central part of the base.

7. The hinge assembly of claim 6, said linear actuator having a cylinder housed in the hollow longitudinal block, the cylinder having a stem traversing a rear wall of the hollow longitudinal block so as to abut a plate positioned behind the rear wall, said linear actuator being actuated by a lever pivotally mounted on an axis that connects ends of respective legs of the Y-shaped configuration of the pair of lateral connecting rods.

8. The hinge assembly of claim 7, wherein said elastic element is a pair of springs positioned in the base at opposite sides of the hollow longitudinal block, the pair of springs having one end abutting against the plate.

9. The hinge assembly of claim 8, wherein the pair of springs are positioned respectively in a pair of spring holders, each of the pair of spring holders having a tapered stem, the tapered stem being inserted in a corresponding hole in the plate.

10. The hinge assembly of claim 9, wherein each of the pair of spring holders has an eyelet at an end thereof, the eyelet being secured to a peg projecting from an end of a leg of the Y-shaped configuration of the pair of lateral connecting rods.

* * * * *